Figure 1:
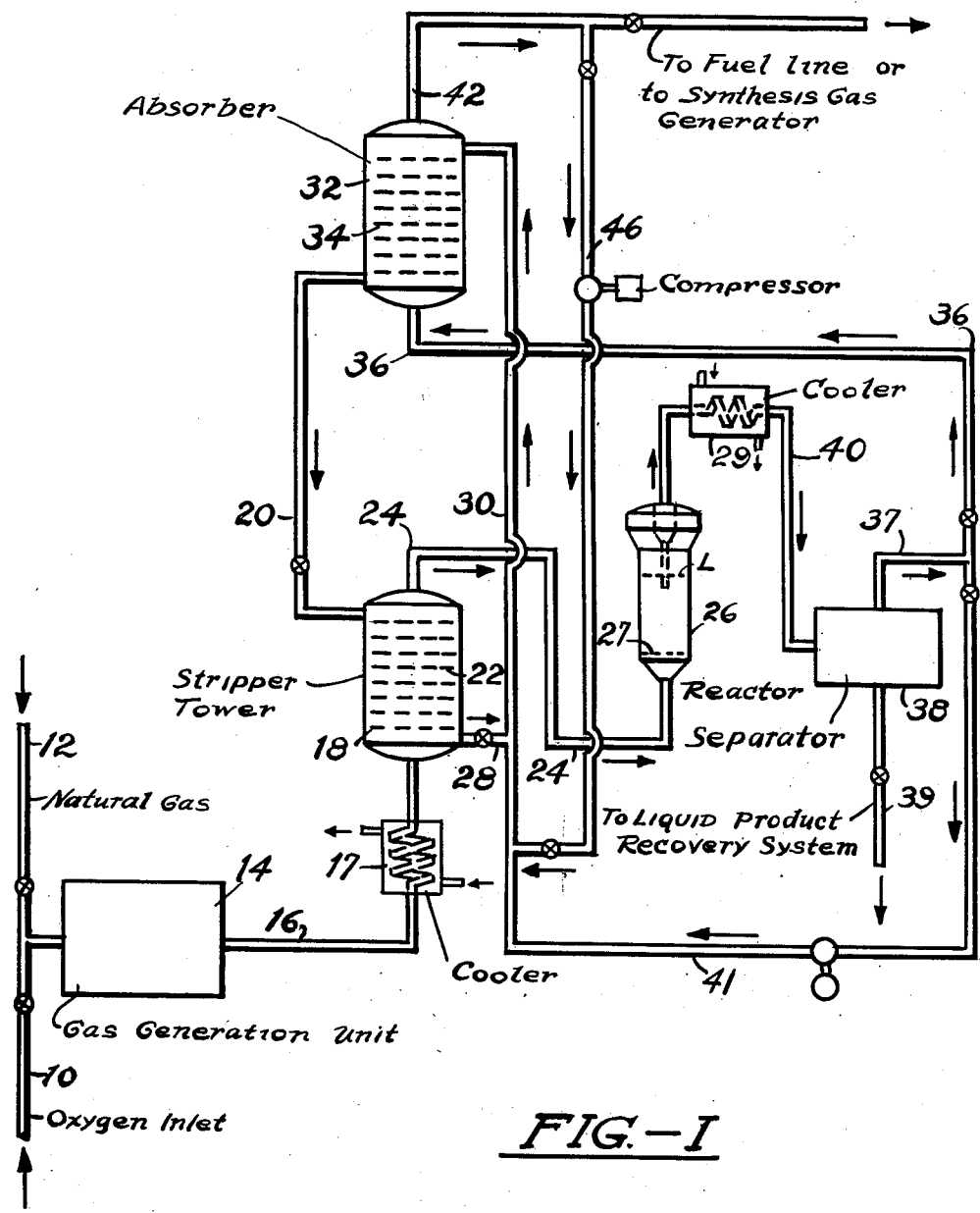

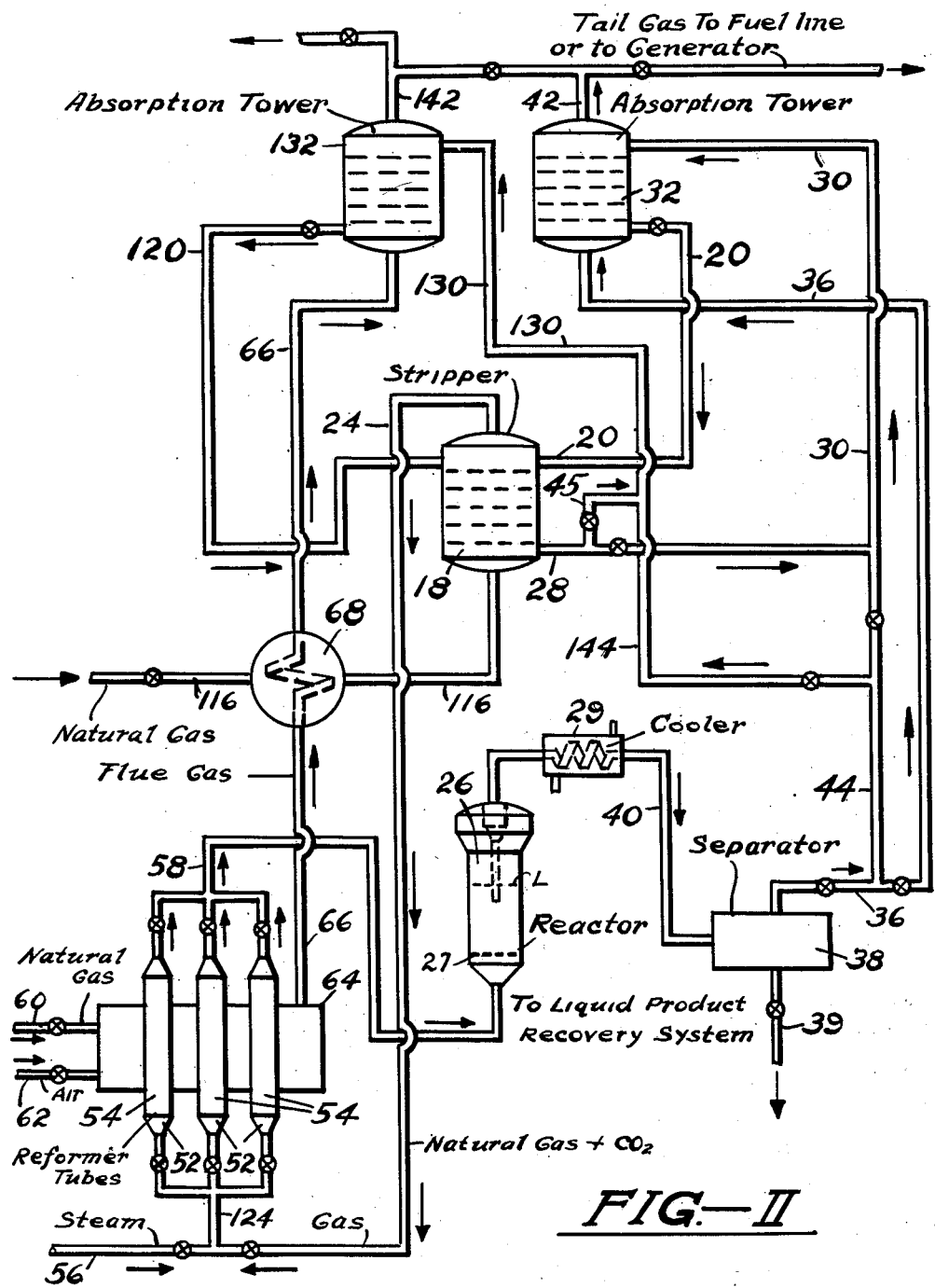
FIG.-II

Patented Oct. 28, 1952

2,615,909

UNITED STATES PATENT OFFICE 2,615,909

REMOVAL OF CARBON DIOXIDE FROM HYDROCARBON SYNTHESIS TAIL GAS

Homer Z. Martin, Cranford, N. J., assignor to Standard Oil Development Company, a corporation of Delaware Application July 17, 1948, Serial No. 39,269

3 Claims. (Cl. 260—449.6)

This invention relates to the separation of weakly acidic gases from industrial mixtures. The invention relates more particularly to a continuous process for removing carbon dioxide from a hydrocarbon synthesis tail gas by means of absorptive solutions, the solutions passing sequentially between an absorption step and a regenerative step employing natural gas or synthesis gas as the desorbing agent.

In the prior art many absorption processes have been proposed and employed for separating weakly acidic gases such as carbon dioxide from industrial mixtures containing these substances as impurities. In these processes an alkaline scrubbing solution is employed as the means of removing the impurities from the gases. The solution after absorption of a certain quantity of the impurity is then regenerated, usually by heating to the boiling point either directly or indirectly with steam so that the steam produced contributes as an aid in removing the absorbent from the solution. In some cases the impurity is removed from solution by the reduction of pressure alone or in combination with heating of the solution. In the present invention the weakly acidic gases, particularly carbon dioxide, are removed from solution by means of synthesis gas or natural gas and the effluent stream comprising carbon dioxide passed as feed to the synthesis unit.

In the synthesis of hydrocarbons from hydrogen and carbon monoxide in the presence of a catalyst of the iron group and particularly iron, the synthesis gases may be passed once through the reactor without the addition of recycle gases to the fresh feed. With the feed compositions usually used in which the $H_2/CO$ ratio is generally in the range of 2 to 1, and more likely in the range of 1.5 to 1.8 to 1 if natural gas is the original starting material from which the synthesis gases are prepared, the ratio of hydrogen to carbon monoxide consumed is considerably lower than the ratio of these components present in the fresh feed, and as a result low conversion of the synthesis gas to useful products occurs. To overcome this disadvantage, recycling of the gas from the reactor outlet to the feed inlet has been proposed. In the past, this has provided difficulties and has been found to be very expensive. Thus, if low conversion of methane is used in the synthesis gas production by any process, such as reforming or partial oxidation, the recycling of tail gas in the synthesis step is particularly difficult because of the high methane content of the reaction gases. In the present invention, recycling of the tail gases may be reduced or eliminated completely; carbon dioxide is removed and recovered from the reactor effluent gases and is recycled to the feed inlet along with the synthesis gas and reacts with part of the hydrogen in accordance with the water gas shift reaction, converting it to carbon monoxide and water vapor. Since this water gas reaction is apparently more rapid than the synthesis reaction and since the carbon monoxide is more readily used up than the hydrogen, this recycling of carbon dioxide increases the rate at which the hydrogen is used up and is converted to useful products.

It has also been found that adding carbon dioxide in substantial quantities to the hydrocarbon synthesis reactor under well-defined conditions yields substantial quantities of economically useful fatty acids as well as high yields of high octane gasoline.

The synthesis of hydrocarbons from mixtures of hydrogen and carbon monoxide obtained from processing natural gas or coal gas renders it frequently desirable to absorb carbon dioxide from the feed supply and cycle this absorbed gas to another part of the synthesis plant, such as the gas generator or the synthesis reactors. In a number of instances this operation has proven to be so expensive that processes based on carbon dioxide absorption have had to be abandoned. The main reason for the high cost of carbon dioxide absorption is the reactivation of the absorption medium. In the past this has been carried out in some cases by releasing the pressure on the absorption solution and stripping it with steam. Not only is the steam itself costly because of the large quantities required, but unless the carbon dioxide is to be wasted, this steam must be condensed if the carbon dioxide is to be recovered. Furthermore, large quantities of cooling water are required for such processing. In the present invention, the cost of carbon dioxide absorption is greatly reduced by stripping the solution of carbon dioxide with synthesis gas or natural gas to be used in the hydrocarbon synthesis.

The principal object of the invention is to remove weakly acidic gases, especially carbon dioxide, from industrial gases, especially hydrocarbon synthesis gas mixtures, containing a wide range of carbon dioxide content by continuous processing involving absorption and solvent regeneration at relatively low cost.

Another object of the invention is to remove, in a novel and advantageous manner, carbon dioxide from hydrocarbon synthesis recycle and tail gas by absorbing at least a portion of the $CO_2$ content of such gases in absorbent solutions and employing stripping agents such as hydrocarbon synthesis gas or natural gas to remove the carbon dioxide from the absorbent solutions and passing the recovered carbon dioxide together with the stripping agent to the same equipment for utilization of both the carbon dioxide and the stripping agent. Other objects and advantages of the invention will appear hereinafter.

In accordance with the invention, hydrocarbon synthesis gas produced by any desired process, such as by partial oxidation of natural gas or methane by oxygen or metal oxides, methane reforming, etc. may be passed through a stripper tower where it contacts a rich solution containing carbon dioxide in the liquid scrubbing medium. This is the absorbing liquid removed from the bottom of the absorption tower, and may consist of any conventional $CO_2$ scrubbing material. The synthesis gas, because of its low $CO_2$ partial pressure, causes evolution of the latter from the solution, and the synthesis gas thus fortified with carbon dioxide may be sent to the synthesis plant, which though it may be of any conventional type, preferably is a fluid catalyst plant operating with an iron type hydrocarbon synthesis catalyst. The carbon dioxide-containing tail gases from the subsequent product recovery system are then passed to an absorption tower where they are contacted with stripped liquid absorber removed from the bottom of the stripper, and the gases from which more or less $CO_2$ has been stripped are discharged from the top of the absorption tower for further processing and otherwise used as desired.

The invention will best be understood by referring to the accompanying Figures I and II, which are diagrammatic views in sectional elevation, and also diagrams of flows of material, which represent embodiments of the present invention. Referring now in detail to Figure I, oxygen and natural gas are passed through lines 10 and 12 respectively to a hydrocarbon synthesis gas generation unit 14. In this unit synthesis gas mixture comprising mainly hydrogen and carbon monoxide is produced by the partial combustion of the natural gas with the oxygen. Instead of using gaseous oxygen, any other method of introducing oxygen, such as contacting the natural gas with a metal oxide at appropriate temperatures may be used for the production of synthesis gas in unit 14.

The effluent gas from unit 14 is passed through line 16 and cooler 17 to the bottom of the stripping tower 18. The tower 18 is fitted with contacting devices such as packing, bell caps, Raschig rings or other means of obtaining intimate contact between the downwardly flowing carbon dioxide-rich liquid admitted through line 20 from absorber 32 as disclosed below, and the upwardly flowing gas admitted through line 16.

Tower 18 may contain bubble cap plates 22 and may be supplied with the gas from the generation unit at a pressure of from about atmospheric to about 30–600 p. s. i. depending upon the pressure maintained in the hydrocarbon synthesis unit as described below. The stripping tower is preferably operated at a pressure not far from that obtaining in the synthesis reactor. The synthesis gas admitted through line 16 may have a carbon dioxide content of about ½ to 10%. The rich liquid absorbent admitted through line 20 comprises a solution of carbon dioxide in triethanolamine.

The synthesis gas admitted through line 16, due to its low partial pressure of carbon dioxide, causes evolution of the carbon dioxide from the rich solution. The synthesis gas now containing the desired amount of carbon dioxide, is then passed from the unit 18 overhead through line 24 to the hydrocarbon synthesis reactor 26. Reactor 26 is preferably in the form of a vertical cylinder with a conical base and having a grid or screen 27 located in the lower section to effect good gas distribution. Reactor 26 may be charged with finely divided promoted iron or cobalt type synthesis catalyst, having a particle size from about 100–400 mesh. The synthesis gas mixture admitted through line 24, and having a molar ratio of $H_2/CO$ varying between 0.5–3 to 1, preferably between about 1:1 and 2:1, flows upward through grid 27 at a superficial linear velocity in the approximate range of 0.1–3 feet per second, so as to maintain the catalyst in the form of a dense, turbulent, fluidized mass, having a well-defined upper level L. The reaction conditions within reactor 26 are those known for hydrocarbon synthesis catalysts, and may include temperatures of from about 250° to 800° F. and pressures of about atmospheric to 750 p. s. i. g. Catalyst may be supplied to reactor 26 by a hopper (not shown).

The total synthesis product is withdrawn from reactor 26 and is passed via cooler 29 and line 40 to separator 38 wherein liquid and gaseous reaction products and reactants may be separated in a manner known per se. The liquid products may be removed from separator 38 via line 39 and sent to the products recovery system (not shown) for further processing. Tail gas, comprising uncondensed low molecular hydrocarbons, unreacted synthesis gas, and carbon dioxide produced in part by the synthesis reaction, is withdrawn from separator 38 and is passed via lines 37 and 36 to the bottom of carbon dioxide absorption tower 32. The latter is similar in construction to stripper 18 in that it may contain similar contacting devices, such as bubble cap plates 34.

The absorption solution, more or less substantially stripped of $CO_2$, depending upon the $CO_2$ content of the synthesis feed gas desired, is passed from stripper 18 through lines 28 and 30 into the upper portion of carbon dioxide absorbing unit 32. In the tower 32 the downwardly flowing liquid absorbent intimately contacts the upflowing carbon dioxide-containing gas and removes therefrom a substantial amount of its carbon dioxide content. The absorbing liquid may be any of the common liquid solvents for carbon dioxide, such as amino alcohols, sodium carbonate-sodium bicarbonate mixtures, or even water. In the present illustration, the liquid employed is triethanolamine, indicated as passing from the unit 18 through lines 28 and 30 into the tower 32. Absorber tower 32 is preferably operated at a lower pressure than stripping tower 18 depending on the pressure drop through the synthesis system, which is in the range of 5 to 50 p. s. i. The gas mixture admitted through line 36 may have carbon dioxide content of about 25 to 50 percent. Under such conditions of processing the effluent gas removed through line 42 contains substantially less carbon dioxide than admitted through line 36, and may be further processed for recovery of low boiling hydrocarbon constituents, or may be recycled to the synthesis gas generator, the synthesis reactor, or may be passed to a fuel line or to another portion of the system as desired. The carbon dioxide-rich liquid is withdrawn from the lower part of tower 32 and passed to tower 18 through line 20 for stripping.

The power required to circulate the large amount of absorbing liquid is greatly minimized and the use of pumping equipment usual in carbon dioxide scrubbing processes is almost unnecessary. For practical operation in large scale equipment involving the recycling of hundreds of thousands of barrels per day of scrubbing material, there is particular advantage in such an operation. The absorption tower 32 is indicated as being located in an elevated position with regard to the stripping tower 18. In this manner the conduit 20 permits the pressure of the solution therein to aid in the flow to the tower 18 which is operated at a somewhat higher pressure (about 5 to 50 p. s. i.) than absorption tower 32. The liquid partly depleted of carbon dioxide is passed from the tower 18 through line 28 into the upper portion of the tower 32 through line 30; as a means of aiding the flow of the liquid through line 30 part of the gas from separator 38 may be passed through lines 37 and 41 and introduced into line 30 at the junction with line 28. The use of the gas in this manner decreases the density of the fluid passing upward through line 30. In this manner, large volumes of absorbing liquid can be recirculated mainly through the expenditure of energy from the tail gas, which is generally wasted in most installations. Similarly, portions of the gas removed from absorber 32 through line 42 may be used in a similar capacity by being transferred via line 45 to riser line 30.

Figure II shows a modification of the invention wherein it is desirable to return carbon dioxide-comprising gases to the synthesis gas generator. This is particularly advantageous in such cases as where methane is reformed by steam, and the $CO_2$ recycled to keep down $CO_2$ production in this process and to regulate the proportion of hydrocarbon synthesis gas ingredients produced. Figure II shows, in addition, the removal of $CO_2$ from the flue gas used to heat the reforming tubes in the reformation of methane with steam. Similar reference numerals are used in Figure II with similar parts shown in Figure I. Thus natural gas is passed through line 116 through exchanger 68 into the bottom portion of stripper 18. The latter is shown as being supplied by carbon dioxide-rich absorption liquid from absorption towers 32 and 132 through lines 20 and 120 respectively. The effluent natural gas from tower 18 is passed through lines 24 and 124 into the reformer tubes 54, after being mixed with steam admitted through line 56. The reformation product, comprising carbon monoxide, hydrogen and minor quantities of carbon dioxide and water is passed through line 58 to synthesis plant 26, operated substantially in a manner described above. The synthesis products are passed through line 40 and cooler 29 to separator 38. Liquid products are removed via line 39 and sent for further processing to the products recovery system. A portion of the gaseous product from the unit 38 is passed through line 36 for removal of at least part of its carbon dioxide content in tower 32 while another portion may be passed through lines 44 and 144 to aid in the passage of stripped absorbing liquid through lines 30 and 130. The stripped absorbing medium is transferred from stripper 18 to absorber 32 through lines 28 and 30, and to absorber 132 through lines 28, 45, and 130 respectively.

The fuel gas used to heat the reformer tubes 54 may be natural gas and/or synthesis tail gas, and it is passed through line 60 into oven 64. Air for combustion is admitted through line 62. After combustion the flue gas passes from oven 64 through line 66 and exchanger 68 into the absorption tower 132. To complete the cycle, $CO_2$-rich absorber streams are withdrawn from absorbers 132 and 32 via lines 120 and 20 respectively, passed to stripper 18, and the $CO_2$ stripped out by the natural gas entering 18 through 116 is passed, along with the natural gas, through line 24 to methane reforming tubes 54 as described above.

The gases withdrawn overhead from absorbers 132 and 32 respectively through lines 142 and 42 may be recycled, if desired, to the hydrocarbon synthesis reactor, the synthesis gas generator, or be further processed if desired to recover hydrocarbon gases, or may be used as fuel.

In the illustrations of the embodiments of the invention as given, the removal of the carbon dioxide from the solution in tower 18 is effected at normally prevailing temperatures. In some cases it may be advisable to effect the removal of the carbon dioxide in tower 18 at elevated temperatures. When such is desired, the gas admitted through line 116 may be heated to bring the temperature in unit 18 to the desired level, or solutions admitted to the tower 18 may be preheated. The heating of the stripping gas or the solutions may be effected in any external heat exchange equipment or conveniently in the case of the embodiment of the invention illustrated in Figure II by passing the stripping gas in heat exchange in equipment 68 with the flue gas passing through line 66. Similarly, the heat of the flue gas may be utilized for heating the solution or solutions passing to the stripper 18. Similarly, with reference to the process of Figure I, whereas the synthesis gas is generally produced at a temperature of about 2000° F.–2500° F. and is subsequently cooled to about room temperature in cooler 17, this cooling step may be modified to allow this gas, to be used as a stripping medium, to enter vessel 18 at some intermediate temperature, such as 200°–500° F.

Though Figure I has disclosed an embodiment of the invention wherein $CO_2$ is returned to the synthesis reactor and Figure II has shown a modification of the invention wherein $CO_2$ comprising gases are returned to the synthesis gas generator, it is of course an obvious extension of the principles disclosed in this invention to return carbon dioxide to the gas generation unit 14, Figure I, by stripping a portion of the liquid withdrawn from absorber 32 in a stripping tower in which the stripping medium introduced in the lower end is natural gas. This stripper would of course operate at a somewhat greater pressure than the gas generation unit, and the mixture of natural gas and carbon dioxide withdrawn from the stripper would be charged to the generation unit 14.

The gases from which the carbon dioxide has been removed are indicated in Figures I and II as being discharged into the fuel line or passed to a synthesis gas generator. This enrichment of synthesis gas with carbon dioxide can be used to reduce or eliminate the expensive recycle of tail gas. Thus if low conversion of methane is used in the synthesis gas production as by reforming or by the partial oxidation of methane, the recycling of tail gas in the synthesis step is particularly difficult because of the high methane content of the reactor gases. The combination of such a process with the present invention is, therefore, highly advantageous. Also since carbon dioxide is to be recirculated in normal processing to the synthesis generator or synthesis reactor, the invention uses these gases as particularly advantageous stripping agents since they remove the carbon dioxide and at the same time mix it with the gas stream to which it would otherwise have been sent had another absorption process been used. In processing according to the invention only part of the synthesis gas or natural gas to be used in the entire process may be used in the stripping operation or only part of the tail gas from the product recovery system may be treated according to the invention.

In processing according to the invention the absorption may be effected by any of the common solvents known in the art for the absorption of weakly acidic substances such as carbon dioxide. Thus mono-, di- or triethanolamine, amino propanol, sodium carbonate, sodium bicarbonate and the mixtures of the latter two, and water alone under pressure may be employed. From the carbon dioxide rich-solutions, gas having a low carbon dioxide partial pressure may be used to remove the carbon dioxide under normal and slightly elevated temperatures. Thus by the present invention weakly acidic substances, particularly carbon dioxide may be removed from gases under a wide range of total pressure. The amount of liquid circulated through the towers can be readily calculated by those skilled in the art, it being merely necessary to know the absorption capacity of the particular solution under the particular temperature and pressure conditions.

In this processing with weakly alkaline media or water as solvent for the absorption of weakly acid impurities from industrial gases and the subsequent release of the impurities from the solution thus formed to permit repeated use of the solvent medium, the absorption-stripping system may be operated in some cases under substantially adiabatic conditions while in other cases heat may have to added in the stripping stage and cooling effected in the absorption stage. It is to be understood that the process of the invention is not limited to any particular method of producing synthesis gas, and of returning carbon dioxide from the stripper to such gas generation process. Thus, synthesis gas may be produced by oxidation of natural or refining gases rich in methane and ethane by partial oxidation with oxygen or metal oxides, reforming of methane with steam, coal gasification with steam, and the like.

What is claimed is:

1. In the process wherein gases comprising carbon monoxide and hydrogen in hydrocarbon synthesis proportions are generated in a synthesis gas generation zone, and wherein said gases are reacted under hydrocarbon synthesis conditions in the presence of an iron type hydrocarbon synthesis catalyst in a hydrocarbon synthesis reaction zone, and wherein the gaseous reaction product of the reaction between hydrogen and carbon monoxide comprises carbon dioxide, the steps comprising scrubbing at least a portion of said gaseous reaction product with a solvent for carbon dioxide, passing through the solution thus obtained a stripping gas selected from the class consisting of hydrocarbon synthesis feed gas and natural gas whereby carbon dioxide is stripped from said solution, passing at least a portion of said stripping gas containing stripped carbon dioxide to said process and converting said stripping gas and said carbon dioxide in said process.

2. A continuous process for removing carbon dioxide from the normally gaseous reaction product of the hydrocarbon synthesis reaction and for utilizing said carbon dioxide in a hydrocarbon synthesis reaction zone which comprises scrubbing at least a portion of said gaseous reaction product with a solvent for carbon dioxide in a carbon dioxide scrubbing zone, passing through a solution thus obtained a stripping gas comprising hydrocarbon synthesis feed gas, withdrawing solution depleted of carbon dioxide from said scrubbing zone, withdrawing stripping gas and stripped carbon dioxide from said stripping zone, passing at least a portion of said stripping gas containing stripped carbon dioxide to a hydrocarbon synthesis reaction zone, permitting the synthesis gas and carbon dioxide to remain resident in said synthesis reaction zone under synthesis conditions of temperature and pressure to permit the desired conversion, withdrawing valuable liquid hydrocarbon synthesis products from said reaction zone, withdrawing gaseous products comprising carbon dioxide from said reaction zone, and passing said gaseous products to a carbon dioxide scrubbing zone.

3. In the process wherein gases comprising carbon monoxide and hydrogen in hydrocarbon synthesis proportions are generated in a synthesis gas generation zone and wherein said gases are reacted under hydrocarbon synthesis conditions in the presence of an iron-type hydrocarbon synthesis catalyst in a hydrocarbon synthesis reaction zone and wherein the gaseous reaction product of the reaction between hydrogen and carbon monoxide comprises carbon dioxide, the steps comprising scrubbing at least a portion of said gaseous reaction product with a solvent for carbon dioxide, passing through the solution thus obtained a stripping gas comprising carbon monoxide and hydrogen whereby carbon dioxide is stripped from said solution and passing at least a portion of said stripping gas and stripped carbon dioxide to said hydrocarbon synthesis reaction zone.

HOMER Z. MARTIN.

REFERENCES CITED

The following references are of record in the file of this patent:

UNITED STATES PATENTS

| Number | Name | Date |
| --- | --- | --- |
| 2,185,989 | Roberts, Jr. | Jan. 2, 1940 |
| 2,243,869 | Keith, Jr. et al. | June 3, 1941 |
| 2,264,427 | Asbury | Dec. 2, 1941 |
| 2,274,064 | Howard et al. | Feb. 24, 1942 |
| 2,347,682 | Gunness | May 2, 1944 |
| 2,436,957 | Eastman | Mar. 2, 1948 |
| 2,455,419 | Johnson | Dec. 7, 1948 |
| 2,460,508 | Johnson | Feb. 1, 1949 |